(12) United States Patent
Trikutam et al.

(10) Patent No.: US 7,206,323 B1
(45) Date of Patent: Apr. 17, 2007

(54) INTERFACING 622.08 MHZ LINE INTERFACE TO A 77.76 MHZ SONET FRAMER

(75) Inventors: Sivaram Alukuru Trikutam, Pune (IN); Venkatesh Narsimhan, Pune (IN); Chetan V. Sanghvi, Fremont, CA (US); Pallavi Arun Limaye, Pune (IN)

(73) Assignee: Conexant Systems, Inc., Newport Beach, CA (US)

( * ) Notice: Subject to any disclaimer, the term of this patent is extended or adjusted under 35 U.S.C. 154(b) by 886 days.

(21) Appl. No.: 10/093,324

(22) Filed: Mar. 6, 2002

Related U.S. Application Data

(60) Provisional application No. 60/273,964, filed on Mar. 6, 2001.

(51) Int. Cl.
- *H04J 3/16* (2006.01)
- *H04J 3/22* (2006.01)
- *H04J 3/06* (2006.01)

(52) U.S. Cl. .................................. 370/466; 370/503
(58) Field of Classification Search ........ 370/357–360, 370/400, 406, 466, 503–509
See application file for complete search history.

(56) References Cited

U.S. PATENT DOCUMENTS

| | | | |
|---|---|---|---|
| 6,601,186 B1 * | 7/2003 | Fox et al. ........................ 714/4 |
| 6,765,933 B1 * | 7/2004 | Michel et al. ............... 370/539 |
| 2003/0189925 A1 * | 10/2003 | Wellbaum et al. ........... 370/372 |
| 2004/0062261 A1 * | 4/2004 | Zecharia et al. ............ 370/419 |

\* cited by examiner

*Primary Examiner*—Kevin C. Harper
(74) *Attorney, Agent, or Firm*—Martine Penilla & Gencarella, LLP

(57) ABSTRACT

A line card for use in a node of a network to connect to optical network lines is provided. The line card includes an optical interface, and a serializer/deserializer (SERDES) operating at a first frequency. The line card also includes a framer operating at a second frequency where the first frequency is higher than the second frequency. The framer includes a digital step up converter to receive data from the SERDES and a digital step down converter to supply data to the SERDES. The step down converter includes a set of input buffers where each input buffer receives a word of nibbles from the framer. The input buffers are loaded one after another, but extraction from each of the input buffers to a multi-stage multiplexer is triggered so long as a non-reset window is preserved. The step up converter includes a set of input buffers and a register array where each input buffer receives a word of nibbles from the register array. The input buffers are loaded one after another, but extraction from the input buffers to a multi-stage multiplexer is triggered so long as a non-reset window is preserved.

26 Claims, 14 Drawing Sheets

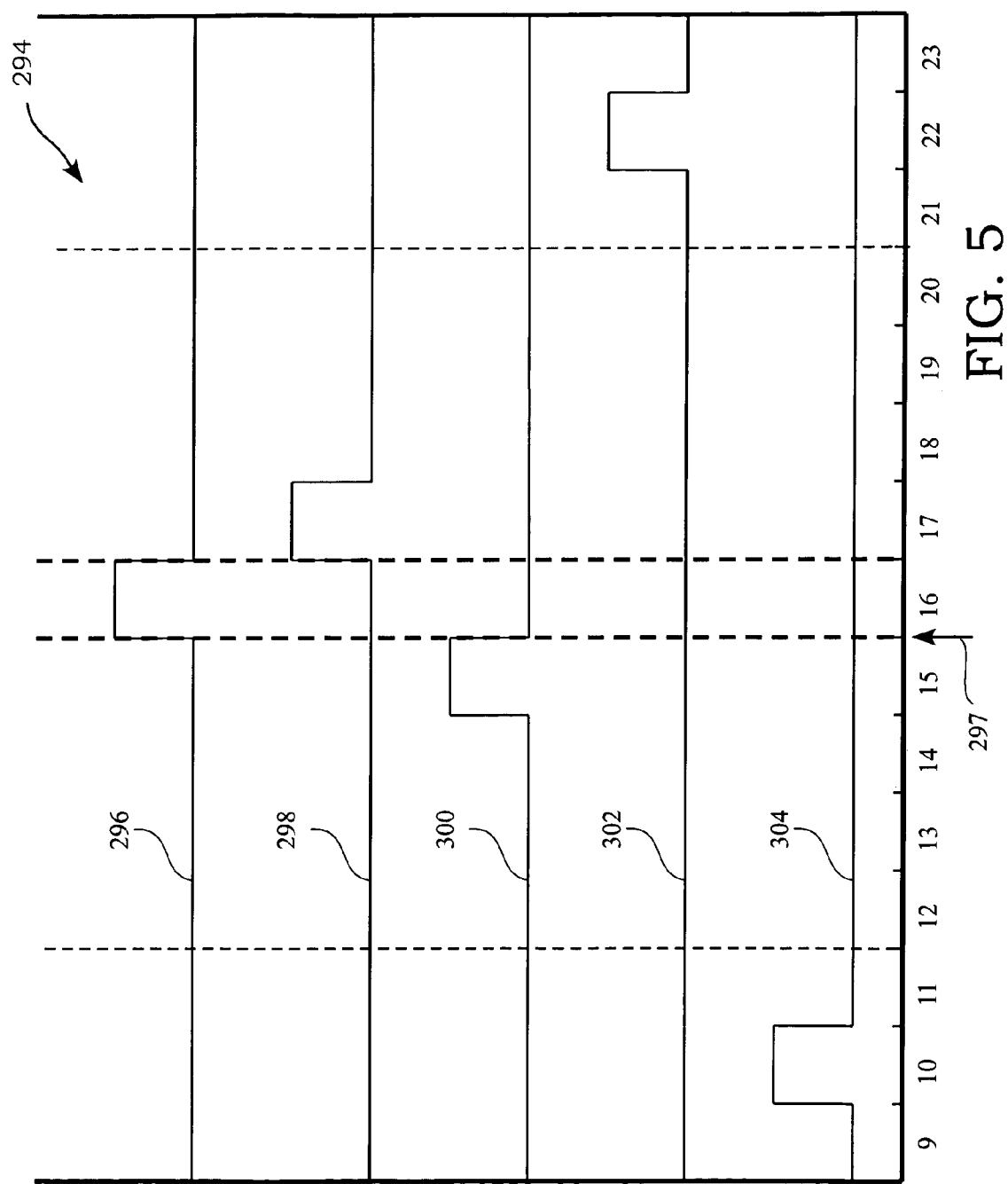

INTERFACING 622.08 MHZ LINE INTERFACE TO A 77.76 MHZ SONET FRAMER

CROSS REFERENCE TO RELATED APPLICATIONS

This application claims priority from U.S. Provisional Patent Application Ser. No. 60/273,964, filed Mar. 6, 2001, and entitled "INTERFACING 622.08 MHZ LVDS LINE INTERFACE TO A 77.76 MHZ SONET FRAMER." The aforementioned application is herein incorporated by reference.

BACKGROUND OF THE INVENTION

1. Field of the Invention

This invention relates generally to SONET based data transfer, and, more particularly, to the efficient and flexible interfacing of a SONET framer to a SERDES device.

2. Description of the Related Art

The growth in computer information technology has created a need to transfer data in an efficient and intelligent manner. One form of data transfer typically utilized is over a synchronous optical network (SONET). SONET is the American National Standards Institute for synchronous data transmission on optical media, and is a standard for connecting fiber-optic transmission systems. SONET defines a base data transfer rate of 51.84 Mbps and a set of multiples of the base transfer rate known as Optical Carrier Levels (OCx). Therefore, SONET typically establishes Optical Carrier Level from 51.8 Mbps to transfer speeds of over 9.953 gigabits per second (GPS).

The SONET standard enables data streams at different rates to be multiplexed. Multiplexing is generally utilized to combine multiple signals such as, for example, several lower rate signals into one higher rate signal for transmission over a single line or a media. One common type of multiplexing combines more than one low-speed signals for transmission over one high-speed connection. Prior rate standards used by numerous countries were often not compatible for multiplexing. With the actuation of SONET, communication carriers in many parts of the world can interconnect their digital carrier and fiber optic systems.

In addition, SONET may serve as the media upon which asynchronous transfer mode may run. Asynchronous transfer mode (ATM) is a switching technology that organizes digital data into 53-byte units and transmits them over a medium using digital signals. Typically, a cell may be processed asynchronously relative to other cells and is queued before being multiplexed over the transmission path.

Generally, systems or networks with data streams of different size and speed need to have their data converted to another type of data stream to be compatible with a another system. For example, in an optical data transmission system such as SONET, there may be a need to interface 622.08 MHz SERDES device to a 77.76 MHz Framer device. In an exemplary network, nodes are connected to other nodes by way of line cards within each node. In one example, a line card within each node has an optical input and an optical output that connects with another line card within other nodes. In this circumstance, a line card with a data stream converter utilizing PLL may be used to convert a 622.08 MHz 4 bit data transmission to a 32 bit 77.76 MHz data transmission and vice versa. A data stream converter utilizing a phase locked loop (PLL) system can change the clocking of data transfer frequencies to compensate for differences or variances in clock synchronization in different types of data transmissions. For example, due to differences in temperature or some other condition that can slightly alter data transmission speeds or clock speeds, input of data into the data stream converter may not be synchronized correctly with the data stream output. Therefore, for example, more data may be inputted into the converter than is being outputted and therefore, either loss of data or scrambling of data may occur. Also, the clock may be slower because of a small jitter, or phase shifts may occur in clocking of data transmission. PLL can determine these types of problems in the phase delay and once the phase variance is locked in, the PLL may find a phase that works with the phase variance. Therefore, PLL may alter the phase of the clocking of data input and output to compensate for many phase changes.

Unfortunately, there are great difficulties associated with using PLL systems. Because PLL is an analog system and SONET Framers are generally digital systems, problems that typically occur when using a combination of analog and digital components make the utilization of the PLL system more unreliable and difficult. In addition it is not easy to integrate an analog component with a digital component. For example, if an analog PLL system is utilized within a digital SONET Framer device, the digital SONET system may be subject to harmful signal noise generated by the analog system. Further problems may occur with validation of the chip. The component is often modeled to make sure it is working up to specification. Regrettably, analog components are generally difficult to model accurately while components utilizing pure digital simulation is usually much easier to model and therefore to validate proper working specifications. In addition to data validation being more difficult with analog components, more engineering, interfacing and redesign are generally necessary with analog components. Further, analog components require different grounds than digital components which creates additional unneeded complications. Therefore use of analog components in conjunction with digital components increases costs and is often undesirable.

Consequently, there is a need for a digital device to interface between different types of data transmission lines with the ability to utilize digital components to account and adjust for phase variances in data transmission clock speeds. There is a further need for a line card connecting an optical line and a network that may adjust and convert data transmission from one type of data transmission format to another so networks having different data transmission standards may intercommunicate without extensive reconstruction of data transmission equipment and lines.

SUMMARY OF THE INVENTION

Broadly speaking, the present invention fills these needs by providing methods for enabling efficient and convenient transfer of data over a variety of interfaces working at different frequencies while providing phase variance compensation. It should be appreciated that the present invention can be implemented in numerous ways, including as a process, an apparatus, a system, computer readable media, or a device. Several inventive embodiments of the present invention are described below.

In one embodiment, a line card for use in a node of a network to connect to optical network lines is provided. The line card includes an optical interface, and a serializer/deserializer (SERDES) operating at a first frequency. The line card also includes a framer operating at a second frequency where the first frequency is higher than the second frequency. The framer includes a digital step up converter to receive data from the SERDES and a digital step down converter to supply data to the SERDES. The step down converter includes a set of input buffers where each input buffer receives a word of nibbles from the framer. The input buffers are loaded one after another, but extraction from each of the input buffers to a multi-stage multiplexer is triggered so long as a non-reset window is preserved. The step up converter includes a set of input buffers and a register array where each input buffer receives a word of nibbles from the register array. The input buffers are loaded one after another, but extraction from the input buffers to a multi-stage multiplexer is triggered so long as a non-reset window is preserved.

In another embodiment, in an optical network, a framer that is connected with a serializer/deserializer (SERDES) within a line card is provided. The framer includes a digital step down converter and a digital step up converter. The step down converter includes a multi-stage multiplexer being configured to supply data to the SERDES. The step up converter includes a set of input buffers where each input buffer receives a word of nibbles from the framer. The input buffers are loaded one after another, but extraction from each of the input buffers to the multi-stage multiplexer is triggered so long as a non-reset window is preserved. The digital step up converter includes a register array which receives data from a SERDES. The digital step up converter also includes a set of input buffers where each input buffer receives a word of nibbles from the register array. The input buffers are loaded one after another, but extraction from the input buffers to a multi-stage multiplexer is triggered so long as a non-reset window is preserved. The SERDES operates at a first frequency and the framer operates at a second frequency where the first frequency is higher than the second frequency.

In yet another embodiment, a line card for use in a node of a network to connect to optical network lines is provided. The line card includes an optical interface and a serializer/deserializer (SERDES) that operates at a first frequency where the SERDES is connected to the optical interface. The line card further includes a framer that operates at a second frequency where the first frequency is higher than the second frequency. The framer includes a digital step up converter and a digital step down converter. The step down converter includes a set of 4 input buffers where each input buffer receives a word of nibbles from the framer. The input buffers are loaded one after another, but extraction from each of the input buffers to a 5 stage multiplexer is triggered so long as a non-reset window is preserved. The 5 stage multiplexer supplies data to the SERDES. The step up converter includes a set of 4 input buffers and a register array where each input buffer receives a word of nibbles from the register array. The input buffers are loaded one after another, but extraction from the input buffers to a 2 stage multiplexer is triggered so long as a non-reset window is preserved. The register array of the step up converter receives data from the SERDES.

In another embodiment, in an optical network, a framer that is connected with a SERDES within a line card includes a digital step down converter and a digital step up converter. The step down converter includes a five stage multiplexer that supplies 32 bit data to the SERDES. The step down converter also includes a set of four input buffers where each input buffer receives eight sets of 4 bit data from the framer. The input buffers are loaded one after another, but extraction from each of the input buffers to the five multiplexer is triggered so long as a non-reset window is preserved. The step up converter includes a register array which receives 4 bit data from the SERDES. The step up converter also includes a set of four input buffers where each input buffer receives 8 sets of 4 bit data from the register array. The input buffers are loaded one after another, but extraction from the input buffers to a two stage multiplexer is triggered so long as a non-reset window is preserved. The SERDES is operated at a frequency of is 622.08 MHz and the framer is operated at a frequency of 77.76 MHz.

In another embodiment, a method for transferring data between a framer and a serializer/deserializer (SERDES) of a line card used in an optical network is provided. In this method, when the data is being transferred from the framer to the SERDES, the method includes receiving data from the framer where the framer operates at a first frequency. The method also includes loading data in a set of input buffers of a digital step down converter where the input buffers are loaded one after another. Each of the input buffers of the step down converter holds a word of nibbles. The method further includes extracting the data from each of the input buffers of the digital step down converter to a multi-stage multiplexer of the step down converter where the input buffers are extracted one after another. The extracting is triggered so long as a non-reset window of the step down converter is preserved. The method also includes transmitting data from the multi-stage multiplexer of the step down converter to the SERDES where the SERDES operates at a second frequency, and the first frequency is higher than the second frequency. In the method for transferring data between a framer and a serializer/deserializer (SERDES) of a line card used in an optical network method, when the data is being transferred from the SERDES to the framer, the method includes transferring the data from the SERDES to a register array. The method further includes receiving the data from the register array. The method also includes loading data in a set of input buffers of a digital step up converter where the input buffers are loaded one after another. Each of the input buffers holds a word of nibbles. The methods further includes extracting the data from each of the input buffers of the digital step up converter to a multi-stage multiplexer of the step up converter where the input buffers are extracted one after another. The extracting is triggered so long as a non-reset window of the step up converter is preserved. The method also includes transmitting the data from the multi-stage multiplexer of the step up converter to the framer.

The advantages of the present invention are numerous. By utilizing intelligent buffering, clocking, clock coordination, and digital step up and digital step down converters, the present invention enables powerful conversion of different types of data transmissions without using phase locked loop (PLL) systems. The present invention may be utilized in a line card in a node that can connect to any suitable type of network thus generating opportunities for seamless connection and data transportation over numerous types of networks while avoiding the problems of using PLL devices. By utilizing the line card with the digital step down and digital step up converters, the problems of the prior art are resolved because the present invention may be digitally based and can consequently interact seamlessly with other digital components. Consequently, phase differences as well as other problems that may arise in data communications may also be remedied.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 5 shows a diagram with multiple waveforms showing synchronized roll over positions in accordance with one embodiment of the present invention.

DETAILED DESCRIPTION OF EMBODIMENTS OF THE INVENTION

Figure 1:
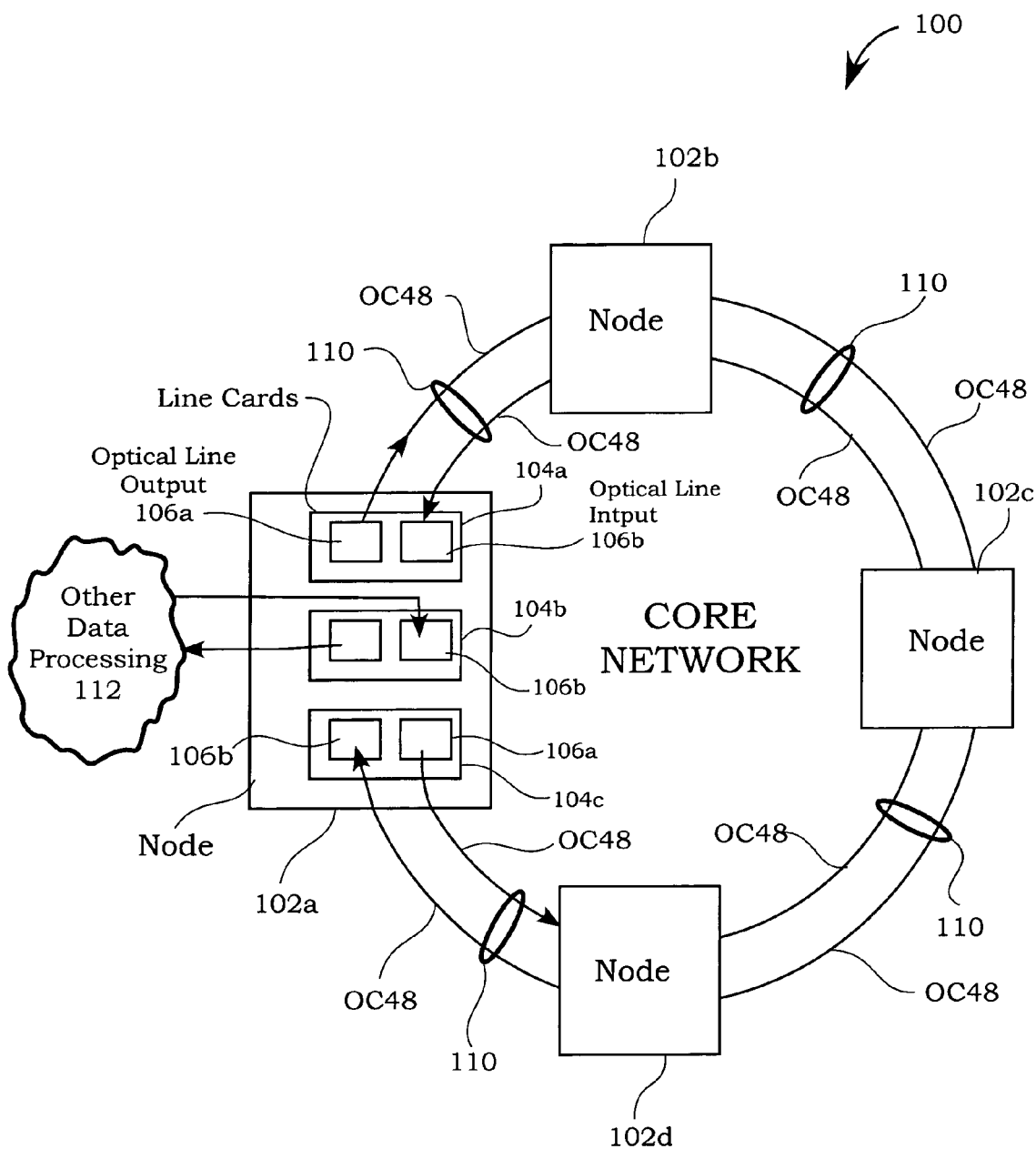
FIG. 1 shows a core network in accordance with one embodiment of the present invention.

An invention is described for the providing apparatus and methods for enabling the interfacing of a framer device to a serializer/deserializer (SERDES) device. It will be obvious, however, to one skilled in the art, that the present invention may be practiced without some or all of these specific details. In other instances, well known process operations have not been described in detail in order not to unnecessarily obscure the present invention.

In accordance with embodiments of the present invention, a line card is provided which interfaces to an optical media and extracts the data contained in it to other components in the equipment which process the extracted data according to various standards and format specifications. The line card interfaces to the optical media through an optical connector fed by a SERDES device. The SERDES device interfaces to the SONET framer device. The SONET framer is a highly dense device typically implemented in complementary metal oxide silicon (CMOS) technology to achieve the high levels of integration required. In an OC-48 line card, an OC-48 framer processes data rates of 2488 Mbps. As the framer device is implemented in CMOS technology, it cannot operate at serial speeds of 2488 Mbps due to inherent limitations of the CMOS technology. Hence, the framer device operates at a wider data bus operating at a slower clock frequency, say a 32-bit data bus at 77.76 MHz. Therefore, to interface the framer device to the SERDES device would require a 32-bit interface. The SERDES device, being a specialized device, due to various technological constraints, operates at a smaller data bus at higher frequency, say 4-bit data bus at 622.08 MHz. The present invention therefore, utilizes digital components such as a step up and step down converter to enable the framer device to interface to the SERDES device. Therefore, PLL devices are not used and problems associated with PLL devices may be avoided. In one embodiment, the present invention in the form of a circuit with step up and step down converters enables intercommunication between an OC-48 SERDES device utilizing 4 bit data transmission at a frequency of 622.08 MHz and an OC-48 SONET framer device that utilizes 32 bit data transmission at a frequency of 77.76 MHz. The high speed 622.08 MHz clock input to the framer device is divided by 8 to generate a 77.76 MHz internal clock in the framer. This clock is used to process the 32-bit data. The 77.76 MHz clock is distributed in the framer device through a buffered clock tree. Owing to the variations in the operating conditions such as temperature and voltage, the delay of the clock tree distributing the 77.76 MHz clock varies. This causes the phase difference between the 622.08 MHz SERDES clock and the 77.76 MHz framer clock to be highly variable in nature. In such an embodiment, the digital step up and step down converters utilize intelligent buffer utilization to take account of the varying clock skew across the 622.08 MHz SERDES clock and the 77.78 MHz framer clock. In addition, phase variances caused by temperature or voltage or some other variable may be monitored and compensated for.

FIG. 1 shows a core network 100 in accordance with one embodiment of the present invention. Although the core network 100 is depicted in a circular network form, it should be understood that the core network 100 may be in any suitable type of form with any suitable type of interconnectivity between any suitable number of nodes. In one embodiment, the nodes 102a, 102b, 102c, and 102d form the core network 100. Optical line 110 connects the nodes 102a, 102b, 102c, and 102d together. It should be understood that the optical line 110 may be any suitable type of optical line such as for example OC-1, OC-3, OC-12, OC-48, OC-192 etc. In one embodiment, the optical line 110 is an optical carrier 48 (OC-48) line which transmits data at a rate of 2.488 Gbps (Gigabits per second). In another embodiment, the node 102a includes line cards 104a, 104b, and 104c. Each of the lines cards 104a, 104b, and 104c includes an optical line output 106a and optical line input 106b. In one embodiment, line card 104b is connected to cards (that may be on a network) implementing other types of data processing 112 through a backplane 121 (shown in FIG. 2A). In this embodiment, the line card 104b enables communication between the backplane 121 and the optical line 110. It should be understood that the backplane 121 may be interfacing to a variety of cards implementing various kinds of data processing 112.

Figure 2A:
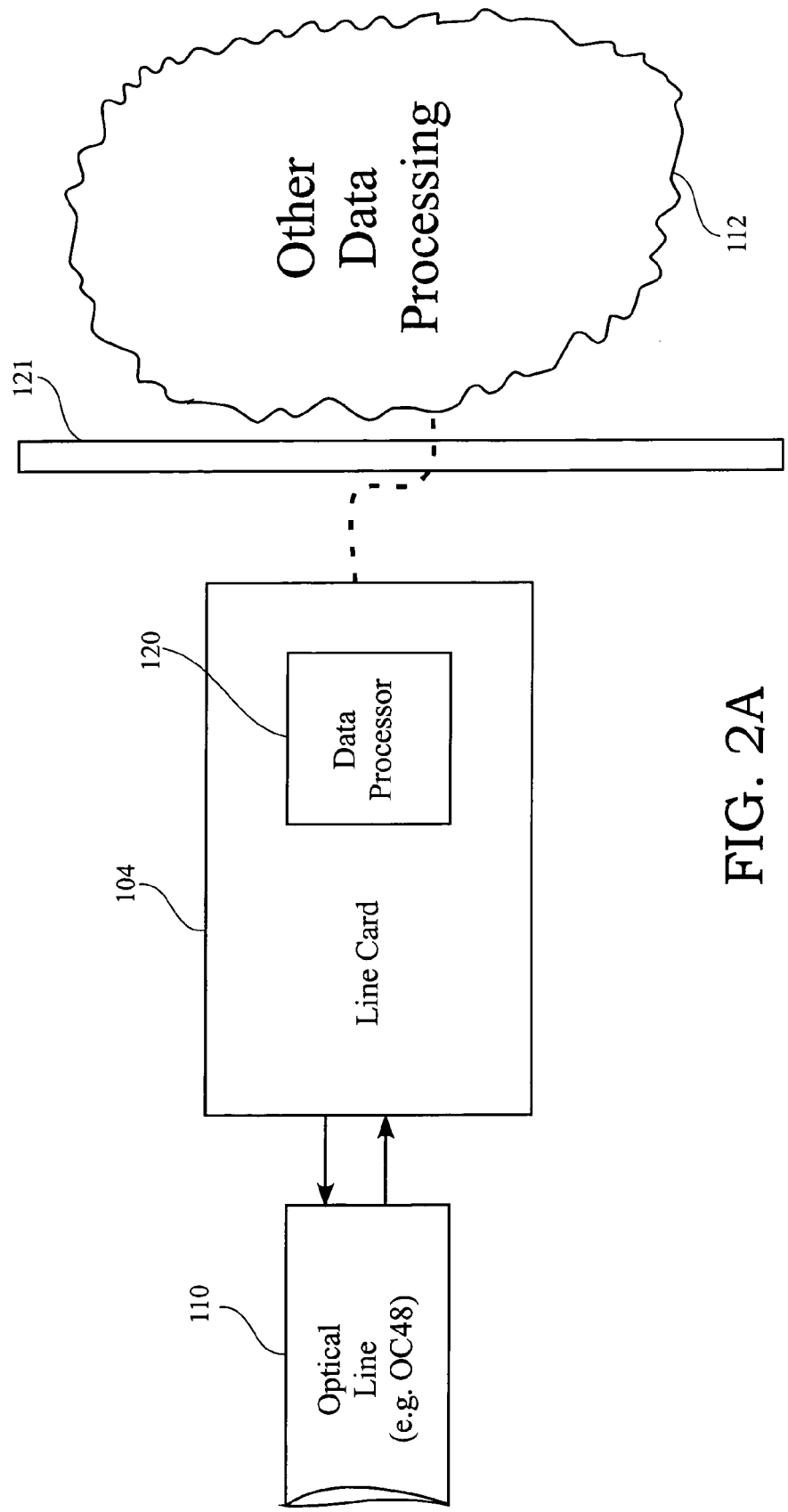
FIG. 2A depicts a connection path between an optical line and an ATM switching card by way of a line card in accordance with one embodiment of the present invention.
Figure 2B:
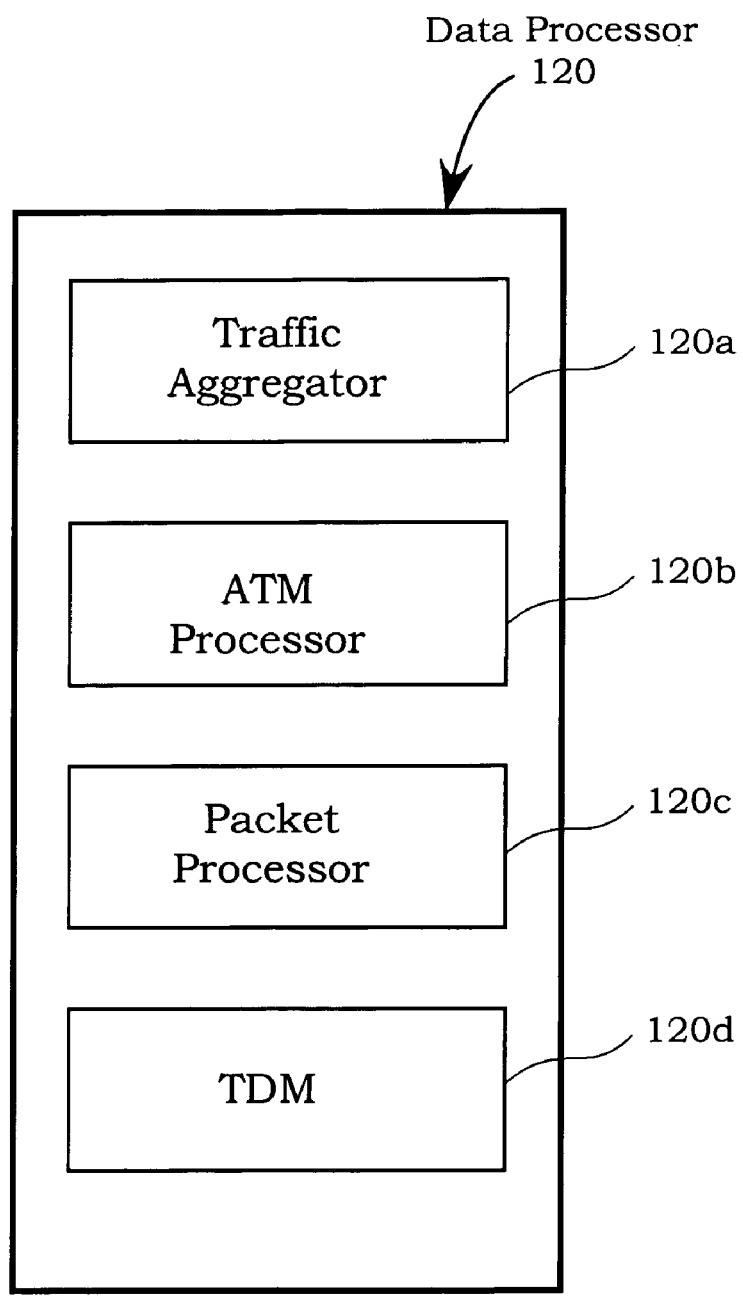
FIG. 2B shows a detailed view of internal components of a data processor in accordance with one embodiment of the present invention.

FIG. 2A depicts a connection path between an optical line 110 and an ATM switching card by way of a line card 104 in accordance with one embodiment of the present invention. In one embodiment, the connection path starts from the optical line 110 which then connects to a line card 104 within a node. The line card 104 includes a data processor 120 which may enable the line card 104 to communicate with other cards processing data according to various standards. It should be understood that the data processor 120 may contain any suitable number or type of subprocessors such as, for example, a traffic aggregator, an ATM processor, a packet processor, and a time division multiplexer (TDM) as shown in FIG. 2B. The line card 104 may be connected to other data processing 112 via the backplane 121.

FIG. 2B shows a detailed view of internal components of a data processor 120 in accordance with one embodiment of the present invention. It should be understood that the data processor 120 may contain any suitable number of internal components that are capable of processing any suitable type of data format. In one embodiment, the data processor 120 includes a traffic aggregator 120a, an ATM processor 120b, a packet processor 120c, and a TDM 120d. Each of the internal components allows communication with different types of networks and/or devices. Therefore, by use of the data processor 120, a line card may be able to communicate with a plethora of different devices thus enabling a single line to have nearly universal communication capabilities.

Figure 3:
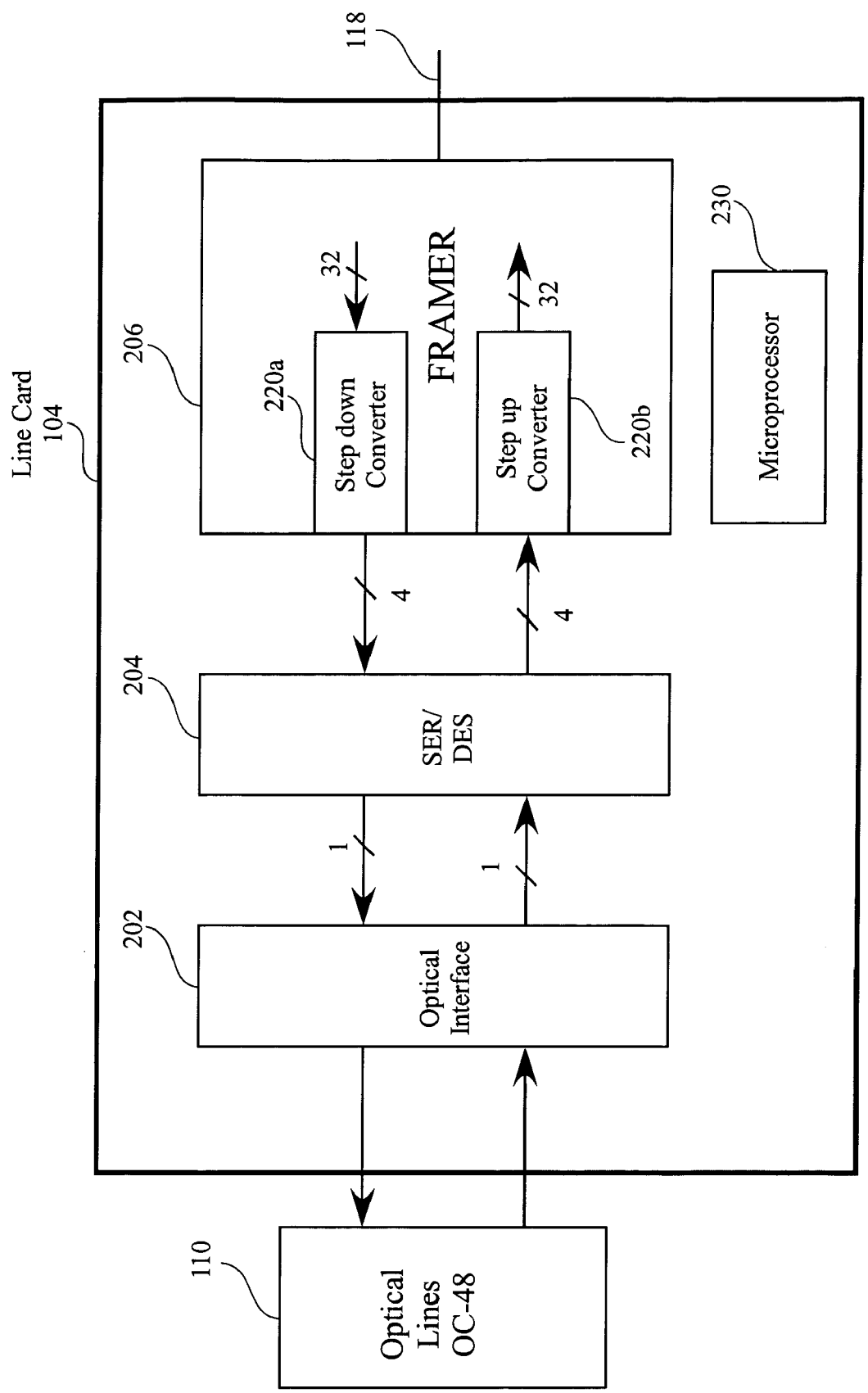
FIG. 3 shows a detailed view of a line card connected with optical lines in accordance with one embodiment of the present invention.

FIG. 3 shows a detailed view of a line card 104 connected with optical lines 110 in accordance with one embodiment of the present invention. The line card 104 contains an optical interface 202, a serializer/deserializer (SERDES) 204, a framer 206, and a microprocessor 230. The framer 206 includes a step down converter 220a and a step up converter 220b. A connection 118 connects the framer to various data processors on the line card. The optical lines 110 are connected to the line card 104 through the optical interface 202.

In one embodiment, the line card 104 is connected to a network through the optical lines 110 by way of the optical interface 202. In this embodiment, the framer has an internal 32-bit data bus. This is interfaced to the SERDES 204 through the step-up and step-down converters 220. In one embodiment, the step down converter 220a changes the 32 bit data with a clock frequency of 77.76 MHz into a 4 bit data at a clock frequency of 622.08 MHz. It should be understood that the data-bus width conversion may be of any suitable integral multiple. (such as for example, 16 bit data at 155.52 MHz converted to 4-bit data at 622.08 MHZ or 64-bit data at 38.88 MHz converted to 8-bit data at 311.01 MHz, etc.) In this embodiment, the 4 bit data is transferred to the SERDES device that converts the 4 bit data to a serial data stream. The serial data stream is converted to optical signals by the optical interface 202 and transmitted by way of the optical lines 110.

As can be appreciated, one embodiment of the present invention enables one type of data-bus width conversion (e.g., 32 bit data at 77.76 MHz to 4-bit data at 622.08 MHz). As disclosed previously, it should be understood that the present invention may convert the data-bus width in several configurations.

Figure 4A:
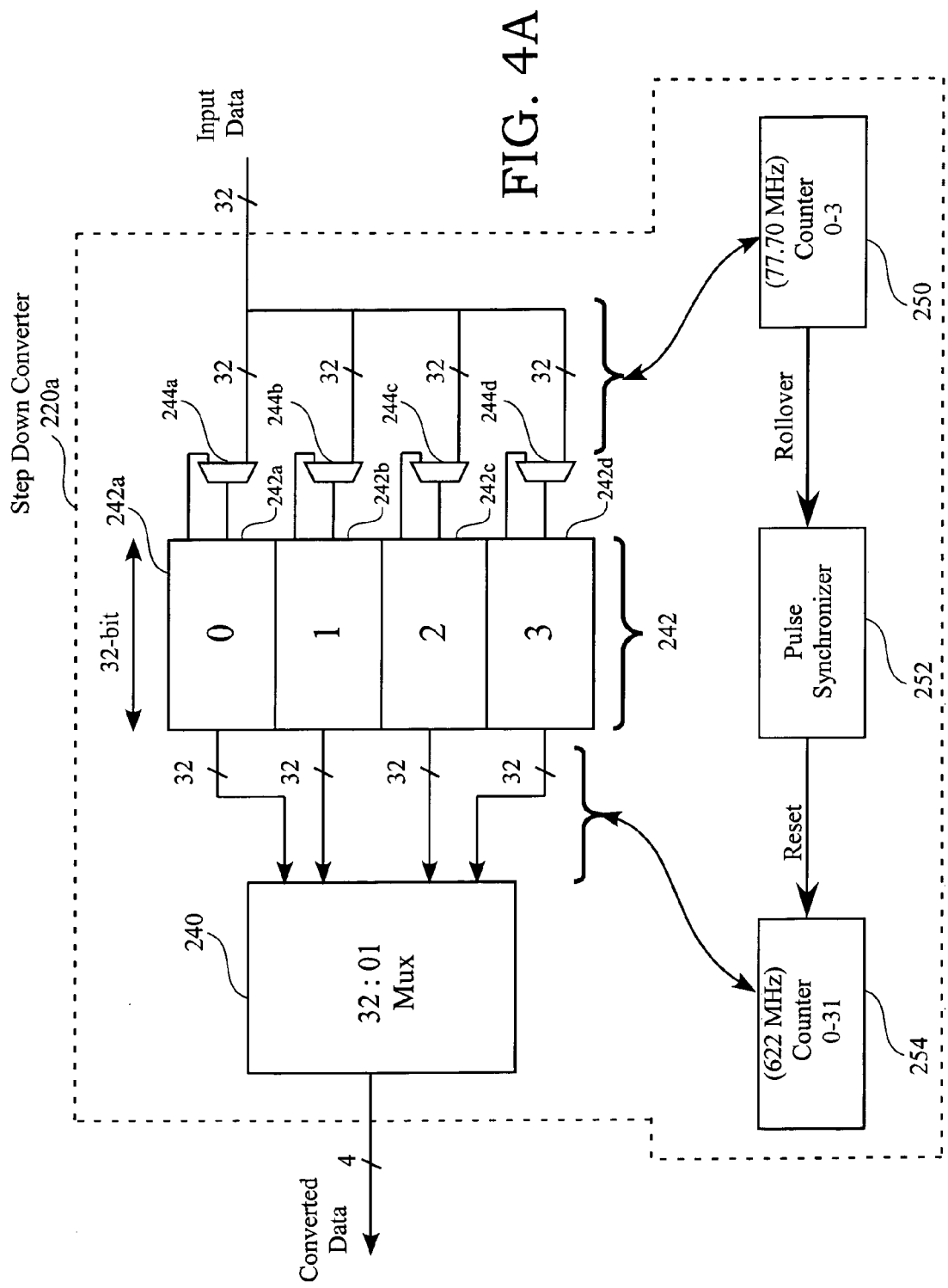
FIG. 4A shows an expanded view of a step down converter in accordance with one embodiment of the present invention.

FIG. 4A shows an expanded view of a step down converter 220a in accordance with one embodiment of the present invention. In this embodiment, the step down converter 220a contains a multiplexer (Mux) 240 connected to a 4×32 bit buffer 242. The buffer 242 includes input buffers 242a, 242b, 242c, and 242d. Each of the input buffers 242a, 242b, 242c, and 242d can contain 8 nibbles (32 bits) of data. A nibble is four bits of data and 8 nibbles is a word. Therefore, the buffer 242 may contain a total of 32 nibbles. It should be appreciated that the number of input buffers and the number of nibbles per input buffer may be changed depending on the data-bus conversion ratio required. The input buffers 242a, 242b, 242c, and 242d are connected to multiplexers 244a, 244b, 244c, 244d respectively. Data entering the step down converter 220a is loaded into the input buffers 242a, 242b, 242c, and 242d in turn on each clock. This is controlled by enabling only one of the multiplexers 244a, 244b, 244c, or 244d on each clock. The enabling of these multiplexers is controlled by the counter 250 which operates on the 77.76 MHz framer clock and runs from count values 0 to 3. Input data is loaded into buffer 242a when the counter 250 has a value 0, and into 242b when the counter 250 has a value 1 and so on. Hence, each of the buffers 242a, 242b, 242c, and 242d is refreshed once every four clocks or once every 51.44 ns.

The data written into the input buffers 242a, 242b, 242c, and 242d is read out in a manner such that 4-bit data at 622.08 MHz is generated after processing by a nibble multiplexer 240. This is achieved by reading using the counter 254 which operates on the 622.08 MHz SERDES clock and runs from count values 0 to 31. Each of the input buffers 242a, 242b, 242c, and 242d contain 8 nibbles of data and hence the input buffer 242 contains 32 nibbles in all. These nibbles are read out in turn using counter 254 to construct a 4-bit data bus. This is achieved using the nibble multiplexer 240. The nibble multiplexer 240 gets four 32-bit data from the input buffer 242, which is equivalent to 32 nibbles of data. These 32 nibbles are multiplexed to generate one nibble of data every clock. This is achieved by using the counter 254. The first of the 32 nibbles is outputted when the count 254 has a value 0, the second of the 32 nibbles is outputted when the count 254 has a value of 1 and so on.

Figure 4B:
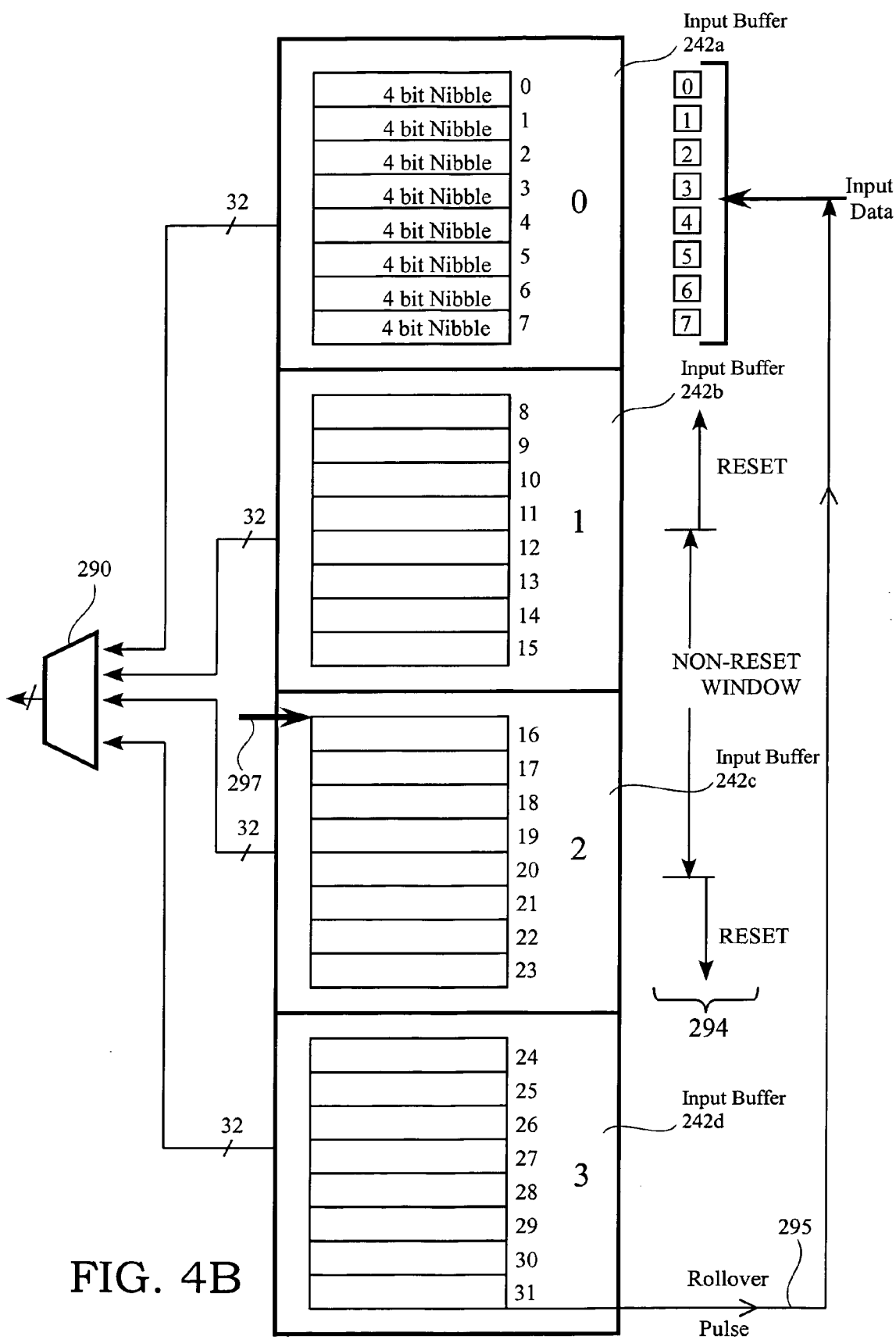
FIG. 4B shows a non-reset window in accordance with one embodiment of the present invention.

FIG. 4B shows a non-reset window 294 in accordance with one embodiment of the present invention. To account for the phase variations between the 622.08 MHz SERDES clock and the 77.78 MHz framer clock, an innovative synchronization approach is used to make sure that the data read out of the input buffers and multiplexed out of the nibble multiplexer is stable when the data is sampled. This is achieved by synchronizing the counter 254 with respect to the counter 250 such that an input buffer location, which has been stable for quite a long time is used to multiplex data out of the nibble multiplexer. The counter 250 generates a rollover indication 295 (as shown in FIG. 4B) whenever its count changes from 3 to 0. This rollover indication is a single clock wide pulse at the 77.76 MHz clock. This rollover indication 295 is synchronized through a pulse synchronizer 252 to convert it into a single clock wide pulse at 622.08 MHz. The pulse synchronizer 252 converts the pulse into a level signal and samples the level signal on the 622.08 MHz clock to detect a change in level and generate a single clock wide pulse at 622.08 MHz. The synchronized rollover pulse 295 is used to reset the counter 254. The counter 254 is reset to such a count that, an input buffer location which has been updated well in time and has been stable for at least two framer clocks duration (25.72 ns) is multiplexed out of the nibble multiplexer 240. The reset value of the counter 254 is chosen so as to account for the varying phase difference between the 622.08 MHz SERDES clock and the 77.78 MHz framer clock. The reset mechanism is explained in further detail in reference to FIG. 4B. When input data is being written into the input buffer 242a, data can be read out either from 242b or 242c since these locations have been refreshed at least two framer clock periods (25.72 ns) in advance. On power-on, the counter 250 is set to 0 so that it writes into buffer location 242a and the counter 254 is set to 16 so that the buffer location 242c is read from. Each time a rollover pulse is generated by counter 250, it is synchronized to the 622.08 MHz through the pulse synchronizer and the resulting synchronized pulse is used to reset the counter 254 such that it has a count of 16 when the counter 250 had a count 0. As the device operation is in progress, and due to the variations in operating conditions like temperature and voltage with time, phase differences set in between the 622.08 MHz SERDES clock and the 77.76 MHz framer clock. These variations cause the relationship between the counter 250 and counter 254 to drift. To account for gradual phase variations of a small degree, the counter 254 is not reset to a different value even if the synchronized rollover pulse does not occur at a position corresponding to location 16.

The non-reset window may encompass any suitable number of locations as long as the data transmission may be properly managed. In one embodiment, the non-reset window may stretch 4 locations on either side of location number 16. Location 16 is shown by an arrow 297. The non-reset window therefore starts from location 12 through location 20. If the synchronized rollover pulse occurs outside this window, which is the reset window, the counter 254 is forced to reset to a safe value in the non-reset window. This is further illustrated in FIG. 5. The construction of the nibble multiplexer 240 is further explained in FIGS. 4C and 4D.

The 32 nibble to 1 nibble multiplexer is implemented in 5 stages to account for the high frequency of operation (622.08 MHz). The 5 stage multiplexer is implemented as a 3-stage multiplexer followed by a 2-stage multiplexer. The 3-stage multiplexer is illustrated in FIG. 4C and the 2-stage multiplexer following it is illustrated in FIG. 4D.

Figure 4C:
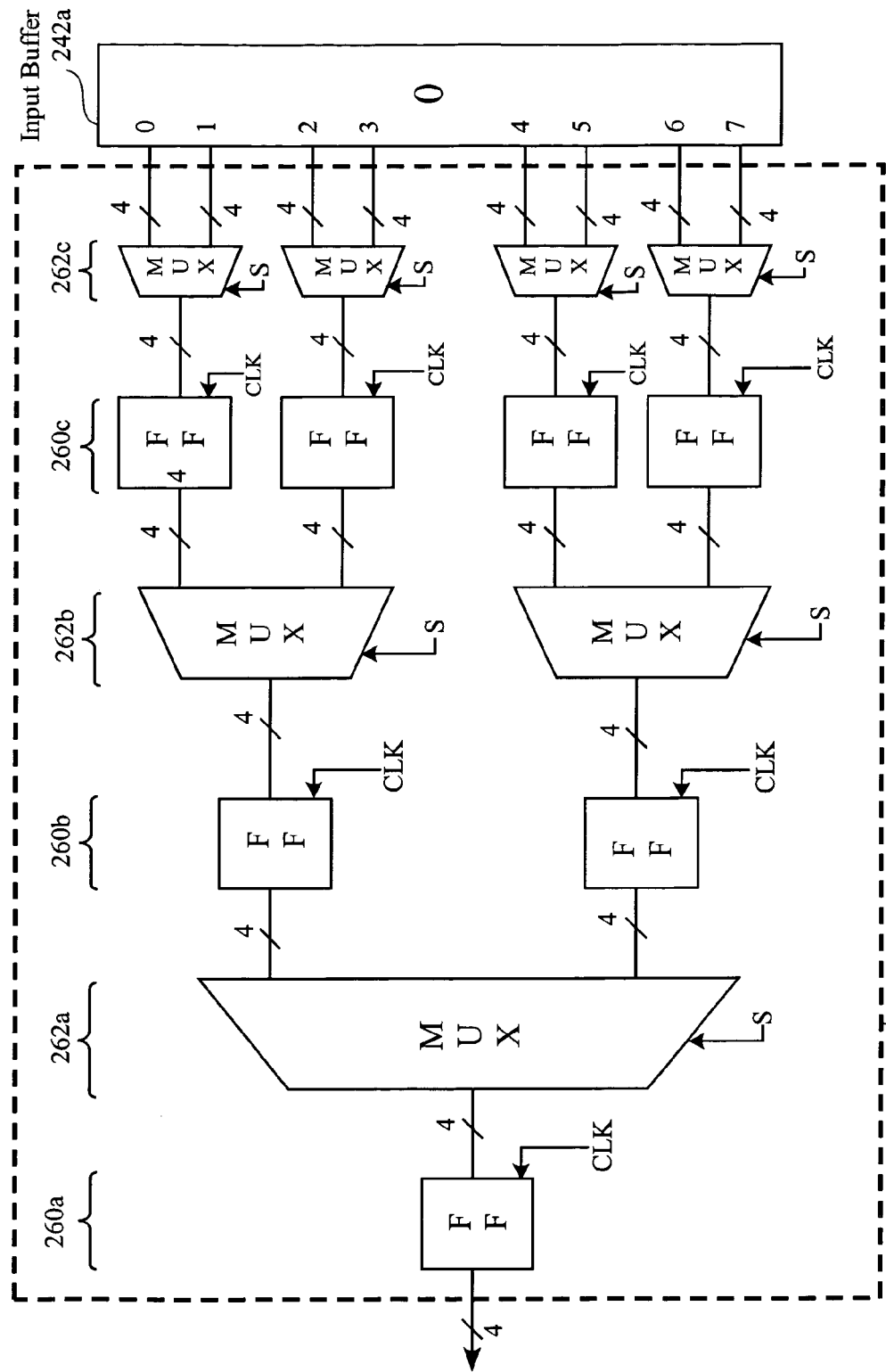
FIG. 4C shows a 3-stage multiplexer in accordance with one embodiment of the present invention.

FIG. 4C shows a 3-stage multiplexer 280 in accordance with one embodiment of the present invention. The 3-stage multiplexer 280 includes three sets of multiplexers 262a, 262b, and 262c. The 3-stage multiplexer 280 also includes three stages of flip flops 260a, 260b, and 260c. The 3-stage multiplexer 280 receives input from the input buffer 242a. It should be understood that other 3-stage multiplexers like the 3-stage multiplexer exist to receive input from the input buffers 242b, 242c, and 242d. In the 3-stage multiplexer 280 shown in FIG. 4C, the 32-bit data from one input buffer location, 242a, is multiplexed down to a nibble using the multiplexer stages 262a, 262b, and 262c. Each of these stages of multiplexing is registered using the flip-flops 260a, 260b, and 260c to ensure that the circuit operates at 622.08 MHz clock.

Figure 4D:
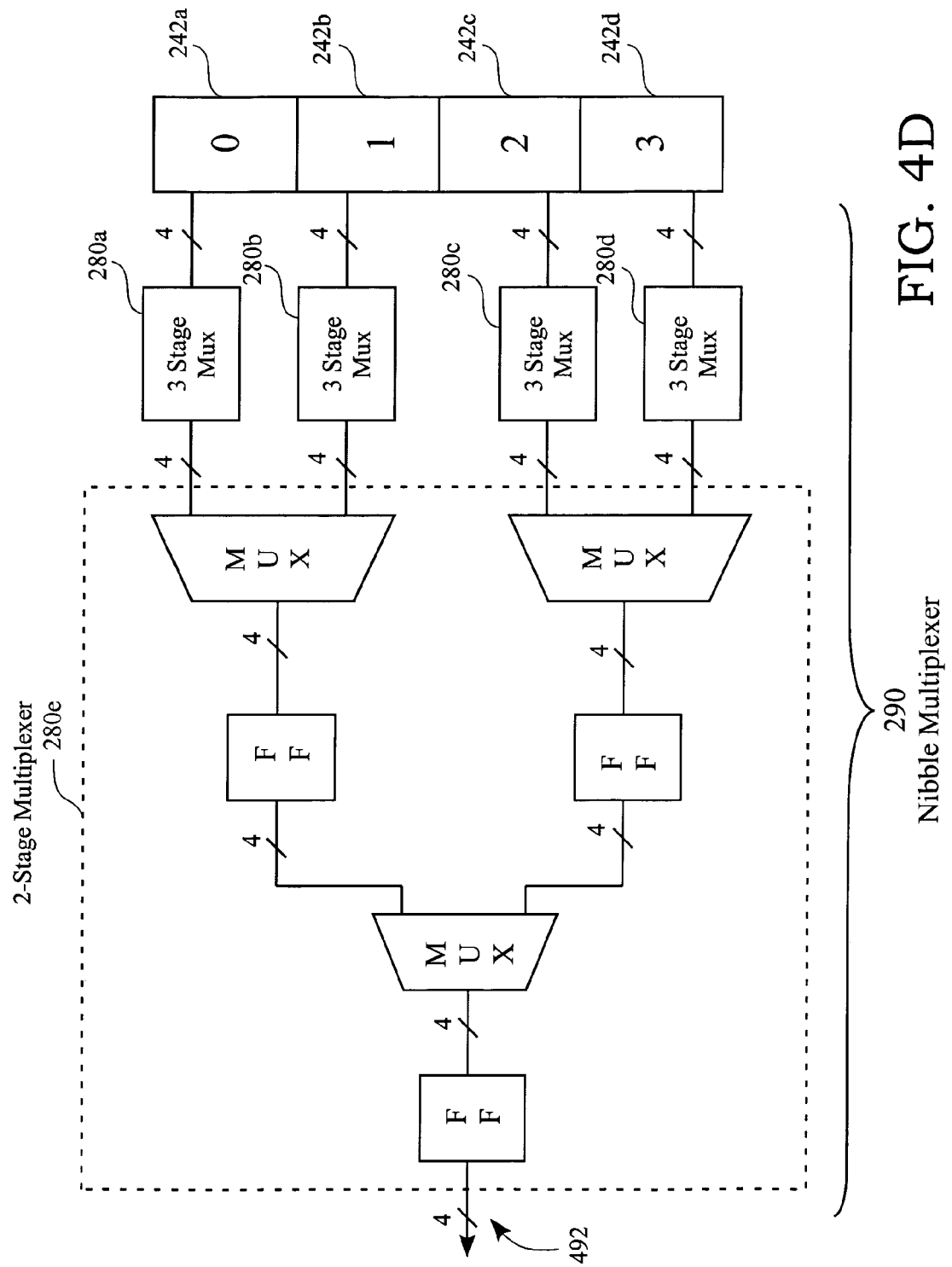
FIG. 4D shows a nibble multiplexer in accordance with one embodiment of the present invention.

FIG. 4D shows a nibble multiplexer 290 in accordance with one embodiment of the present invention. The 32 nibble to 1 nibble multiplexer is implemented in 5 stages to account for the high frequency of operation (622.08 MHz). The 5-stage multiplexer is implemented as a 3-stage multiplexer as shown by multiplexers 280a, 280b, 280c, and 280d followed by a 2-stage multiplexer 280e. The 3-stage multiplexer 280 is discussed in further detail in reference to FIG. 4C and the 2-stage multiplexer 280e following it is illustrated in FIG. 4D. In this multiplexer, the 4-bit output from each of the four 3-stage multiplexers, 280a, 280b, 280c, and 280d are fed to the 2-stage multiplexer 280e. The data is registered after each stage of multiplexing to ensure that the circuit operates at 622.08 MHz.

Figure 6:
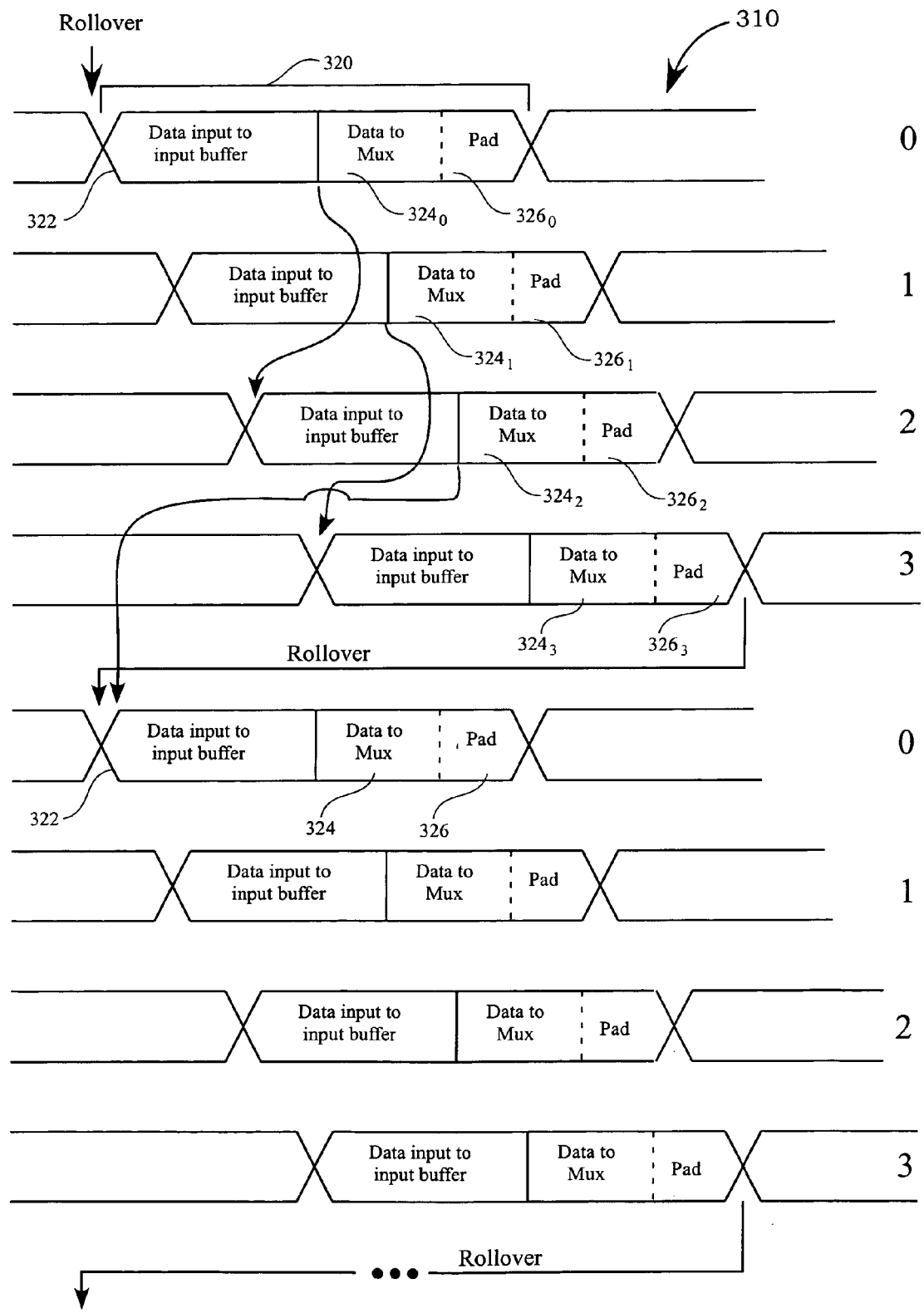
FIG. 6 shows a diagram illustrating a time progression in relation to data input and data output with regard to input buffers in accordance with one embodiment of the present invention.

FIG. 5 shows a diagram 294 with multiple waveforms showing synchronized roll over positions in accordance with one embodiment of the present invention. A waveform 296 is the power-on condition where the synchronized rollover position occurs at a time when the counter 254 (as shown in FIG. 4A) has an equivalent value corresponding to 16 as shown by arrow 297. Due to phase variations, this might drift either to a location as in 298 or as in 300. During such conditions, the counter 254 is not reset and allowed to continue at the current phase. If the synchronized reset value occurs outside the non-reset window, as in 302 or as in 304, it is reset to a value such that counter 254 corresponds to a location in the reset window. This mechanism ensures that the data input to the nibble multiplexer 240 is always stable. This is illustrated in FIG. 6. The four data waveforms correspond to the outputs of the input buffer locations 242a, 242b, 242c, and 242d as shown in FIG. 4A. The buffer locations 242a, 242b, 242c, and 242d are refreshed every four framer clock periods (51.44 ns). However, the window when these data buses are sampled is marked out as discussed in more detail in reference to FIG. 6. For example, for input buffer location 242a, data is refreshed at point 322 and is stable for the entire period 320. The data is sampled either at the beginning of time 324 or time 326 (based on the phase variations), during which time, the data is stable. The construction of the nibble multiplexer 240 is explained in reference to FIGS. 4C and 4D.

FIG. 6 shows a diagram 310 illustrating a time progression in relation to data input and data output with regard to input buffers in accordance with one embodiment of the present invention. In one embodiment, time length 320 shows an amount of time of about 52 ns that progresses from data insertion into the input buffer 242a (as discussed in reference to FIGS. 4A and 4B) through completion of data insertion into the input buffer 242d (as discussed in reference to FIGS. 4A and 4B). In this embodiment, crossover point 322 shows a time point where data insertion into the input buffer 242d is completed and the rollover pulse 295 (as also discussed in FIG. 4A) is sent. Data starts to be inputted into the input buffer 242a at that time. A time section $324_0$ illustrates a time period where data inputted into the input buffer 242a is sent to a multiplexer and multiplexed out of the nibble multiplexer 240. At this time, data has been inputted into the input buffers 242a and 242b and the input buffer 242c is starting to be filled. Then time period $326_0$ represents a one input buffer safety period where about 12.8 ns time period (e.g., time to input data into one of the input buffers) exists for data to be sent to a multiplexer before the input buffer 242a is refilled. A time section $324_1$ shows when data from the input buffer 242b is sent to a multiplexer and multiplexed out of the nibble multiplexer 240. At this time, data has been inputted into the input buffers 242b and 242c and the input buffer 242d is starting to be filled. A time section $326_1$ represents a safety period (also called a pad) which exists for data to be sent to a multiplexer before the input buffer 242b is refilled. A time section $324_2$ shows when data from the input buffer 242c is sent to a multiplexer and multiplexed out of the nibble multiplexer 240. A time section $326_2$ represents a safety period which exists for data to be sent to a multiplexer before the input buffer 242c is refilled. A time section $324_3$ shows when data from the input buffer 242d is sent to a multiplexer and multiplexed out of the nibble multiplexer 240. A time section $326_3$ represents a safety period which exists for data to be sent to a multiplexer before the input buffer 242d is refilled. After the input buffer 242d is refilled, the rollover pulse 295 is generated. After the rollover 295 is generated, the input buffer 242a is refilled. Therefore, through the intelligent use of a non-reset window, a safety period may be maintained where data may be safely outputted from the buffer 242 (as shown in FIGS. 4A and 4B) without concern of data being written over before it is outputted.

Figure 7:
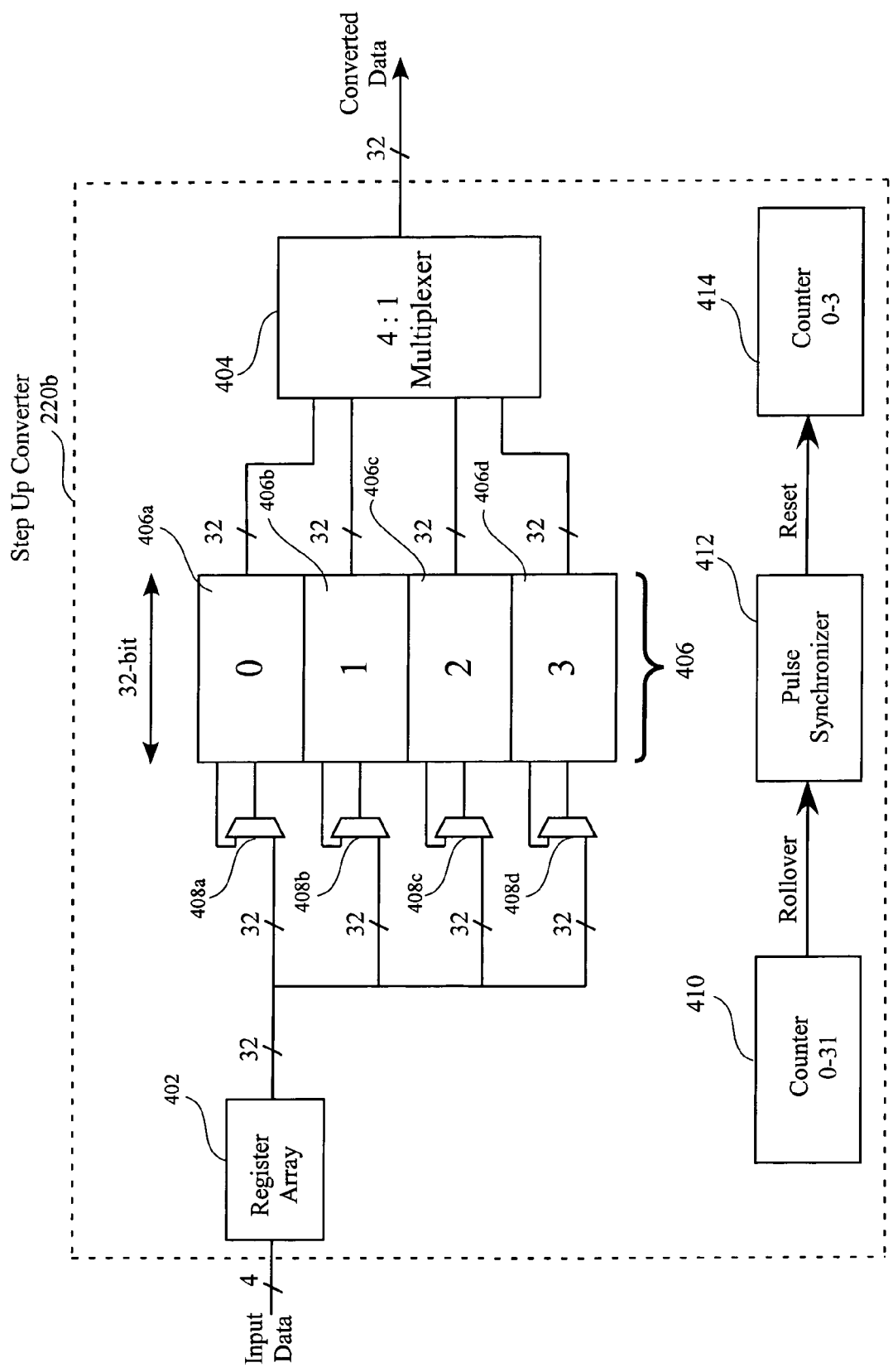
FIG. 7 illustrates an expanded view of a step up converter in accordance with one embodiment of the present invention.

FIG. 7 illustrates an expanded view of a step up converter 220b in accordance with one embodiment of the present invention. In this embodiment, the step up converter 220b contains a register array 402 connected to multiplexers 408a, 408b, 408c, and 408d which are connected to input buffers 406a, 406b, 406c, and 406d respectively. The input buffers 406a, 406b, 406c, and 406d make up a buffer 406. The input buffers 406a, 406b, 406c, and 406d are all connected to a 4 to 1 multiplexer 404 (which may also be described as a word multiplexer or a 4 to 1 word multiplexer) which outputs 32 bit data transmission. A word includes 8'" nibbles. Input data entering the step up converter 220b is a 4-bit data at 622.08 MHz.

After every eight clocks, the register array 402 contains a new value of 32-bit data in it. This 32-bit data is loaded into the input buffers 406a, 406b, 406c, and 406d in turn, once every eight 622.08 MHz clocks. This is controlled by enabling only one of the multiplexers 406a, 406b, 406c, or 406d on each clock. The enabling of these multiplexers is controlled by the counter 410, which operates on the 622.08 MHz SERDES clock and runs from count values 0 to 31. Input data is loaded into buffer 406a when the counter 250 has a value 0, and into 406b when the counter 250 has a value 8 and so on. Hence, each of the buffers 406a, 406b, 406c, and 406d is refreshed once every 32 clocks or once every 51.44 ns. The data written into the input buffers is read out in a manner such that 32-bit data at 77.76 MHz is generated. This is achieved by reading using the counter 414, which operates on the 77.76 MHz framer clock and runs from count values 0 to 3. The four 32-bit words are read out of the input buffer 406 using the counter 414 and multiplexed using the 4 to 1 multiplexer 404. This generates the 32-bit data at 77.78 MHz.

To account for the phase variations between the 622.08 MHz SERDES clock and the 77.78 MHz framer clock, an innovative synchronization approach is used to make sure that the data read out of the input buffers 406 to be multiplexed out of the 4 to 1 multiplexer 404 is stable when the data is sampled. This is achieved by synchronizing the counter 414 with respect to the counter 410 such that an input buffer location which has been stable for quite a long time is used to multiplex data out of the word multiplexer. The counter 410 generates a rollover indication whenever its count changes from 31 to 0. This rollover indication is a single clock wide pulse at the 622.08 MHz clock. This rollover indication is synchronized through the pulse synchronizer to convert it into a single clock wide pulse at 77.76 MHz. The pulse synchronizer converts the pulse into a level signal and samples the level signal on the 77.76 MHz clock to detect a change in level and generate a single clock wide pulse at 77.76 MHz. The synchronized rollover pulse is used to reset the counter 414. The counter 414 is reset to such a count that, an input buffer location which has been updated well in time and has been stable for at least two framer clocks duration (25.72 ns) is given to the 4 to 1 multiplexer 404. The reset value of the counter 414 is chosen so as to account for the varying phase difference between the 622.08 MHz SERDES clock and the 77.78 MHz framer clock. The reset mechanism is explained in detail in the FIG. 9. When input data is being written into the input buffer 406a, data can be read out either from 406b or 406c since these locations have been refreshed at least two framer clock periods (25.72 ns) in advance. On power-on, the counter 410 is set to 0 so that it writes into buffer location 406a and the counter 414 is set to 2 so that the buffer location 406c is read from. Each time the rollover pulse is generated by counter 410, it is synchronized to the 77.76 MHz clock through a pulse synchronizer 412 and the resulting synchronized pulse is used to reset the counter 414 such that it has a count of 2 when the counter 410 had a count 0. As the device operation is in progress, and due to the variations in operating conditions like temperature and voltage with time, phase differences set in between the 622.08 MHz SERDES clock and the 77.76 MHz framer clock. These variations cause the relationship between the counter 410 and counter 414 to drift. To account for gradual phase variations of a small degree, the counter 414 is not reset to a different value even if the synchronized rollover pulse does not occur at a position corresponding to location 2. This is the non-reset window as shown in FIG. 9.

Figure 8:
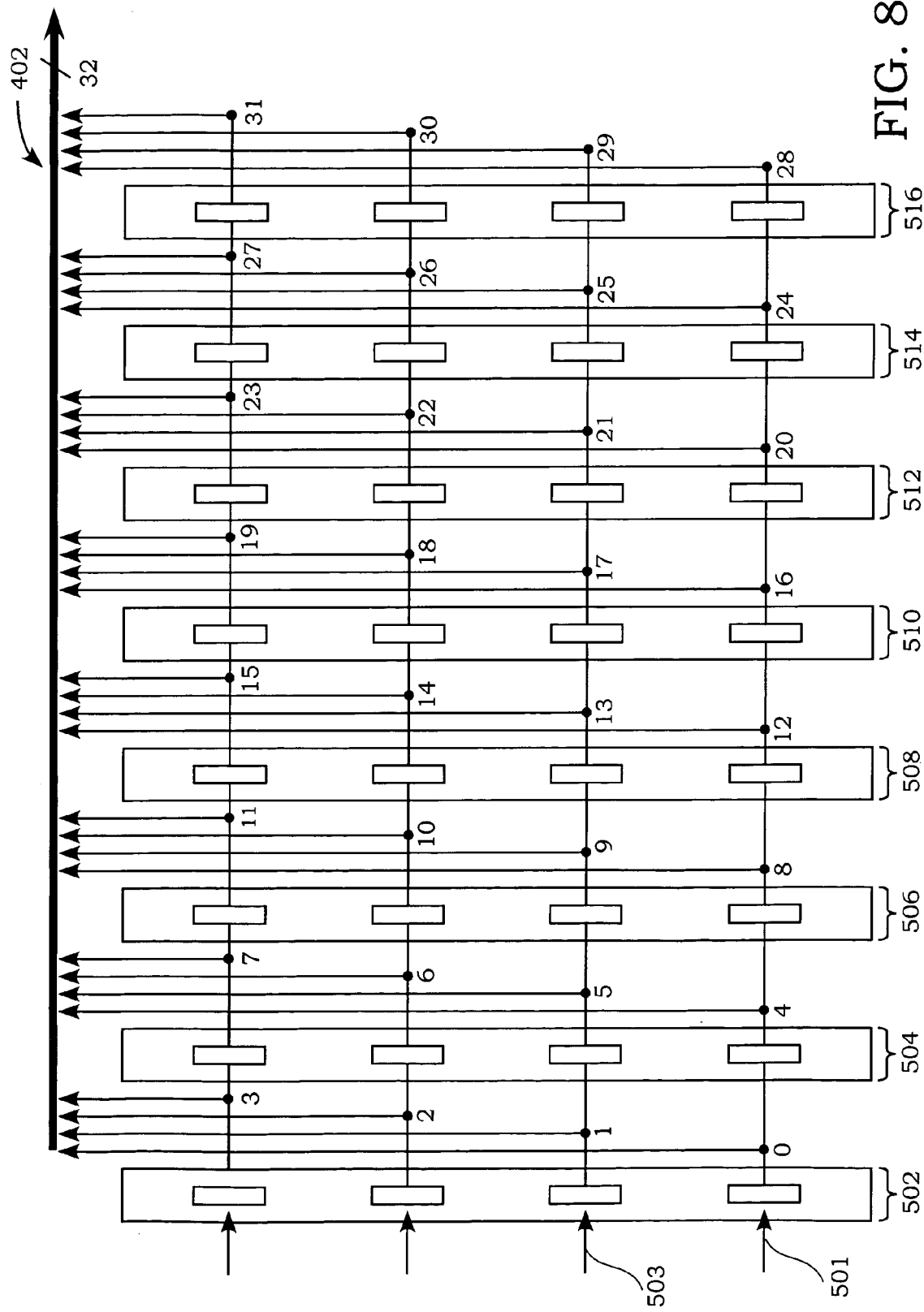
FIG. 8 shows a detailed view of a register array in accordance with one embodiment of the present invention.

FIG. 8 shows a detailed view of a register array 402 in accordance with one embodiment of the present invention. The register array 402 includes 8 buffers 502, 504, 506, 508, 510, 512, 514, and 516. Each of the buffers 502, 504, 506, 508, 510, 512, 514, and 516 includes 4 flip flops that may each hold a nibble of data. In one embodiment, a nibble is 4 bits of data. Data entering the step up converter is loaded into the register array 402 on the 622.08 MHz SERDES clock. The register array can hold eight nibbles of data (32 bits). As discussed above in FIG. 7, after every eight clocks, the register array 402 contains a new 32 bit data value which is inputted into the input buffers 406a, 406b, 406c, and 406d in turn, once every eight 622.08 MHz clocks.

Figure 9:
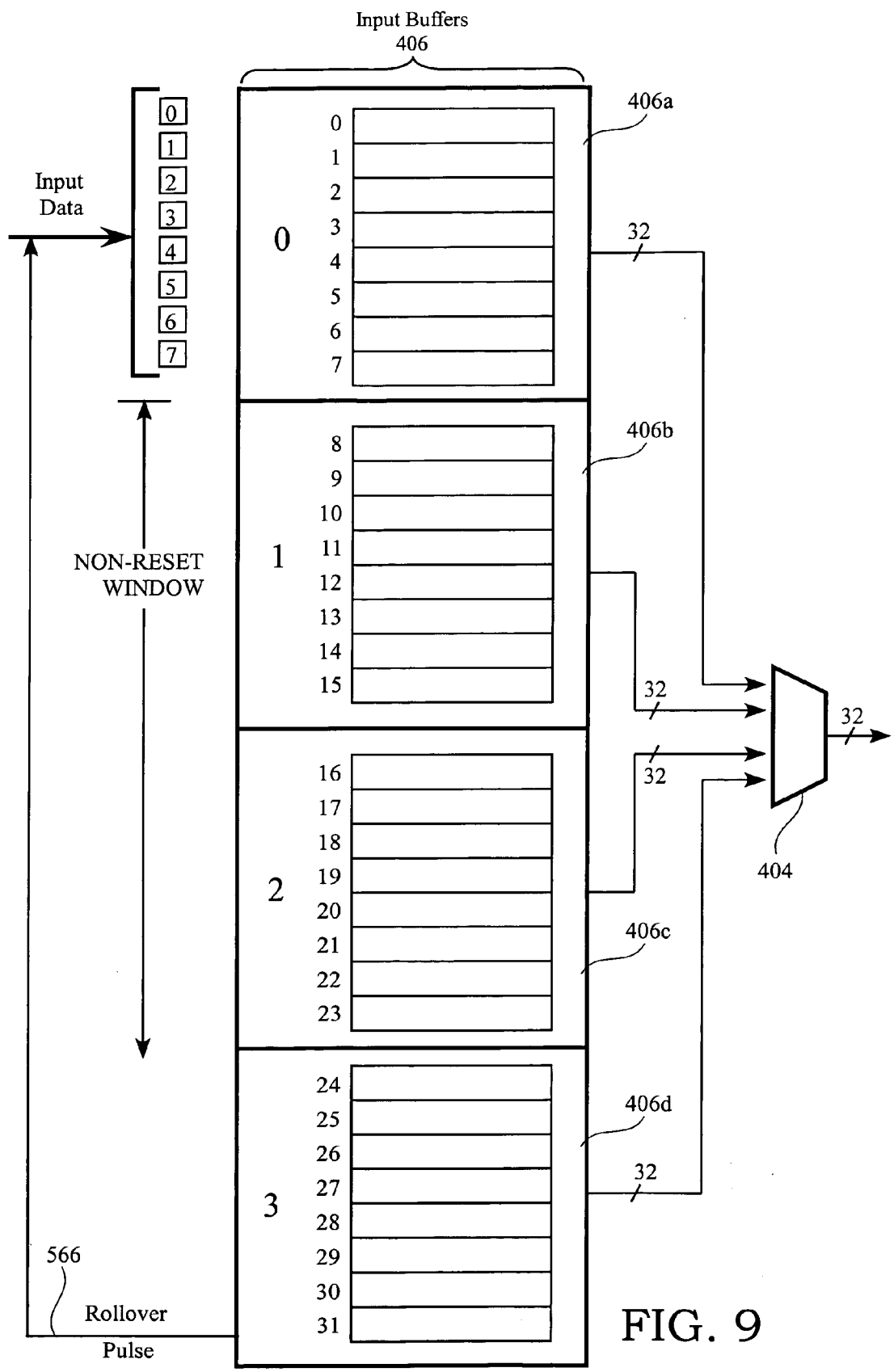
FIG. 9 shows a non-reset window of a step up converter in accordance with one embodiment of the present invention.

FIG. 9 shows a non-reset window of a step up converter in accordance with one embodiment of the present invention. In this embodiment, the non-reset window is the count value corresponding to input buffer locations 406b and 406c (i.e., input buffer positions 1 and 2). If a synchronized rollover pulse 566 occurs outside this window, which is the reset window, the counter 414 is forced to reset to 2. This mechanism ensures that the data input to the 4 to 1 multiplexer 404 is always stable when it is sampled. The 4 to 1 multiplexer 404 is implemented in 2 stages as illustrated in FIG. 10.

Figure 10:
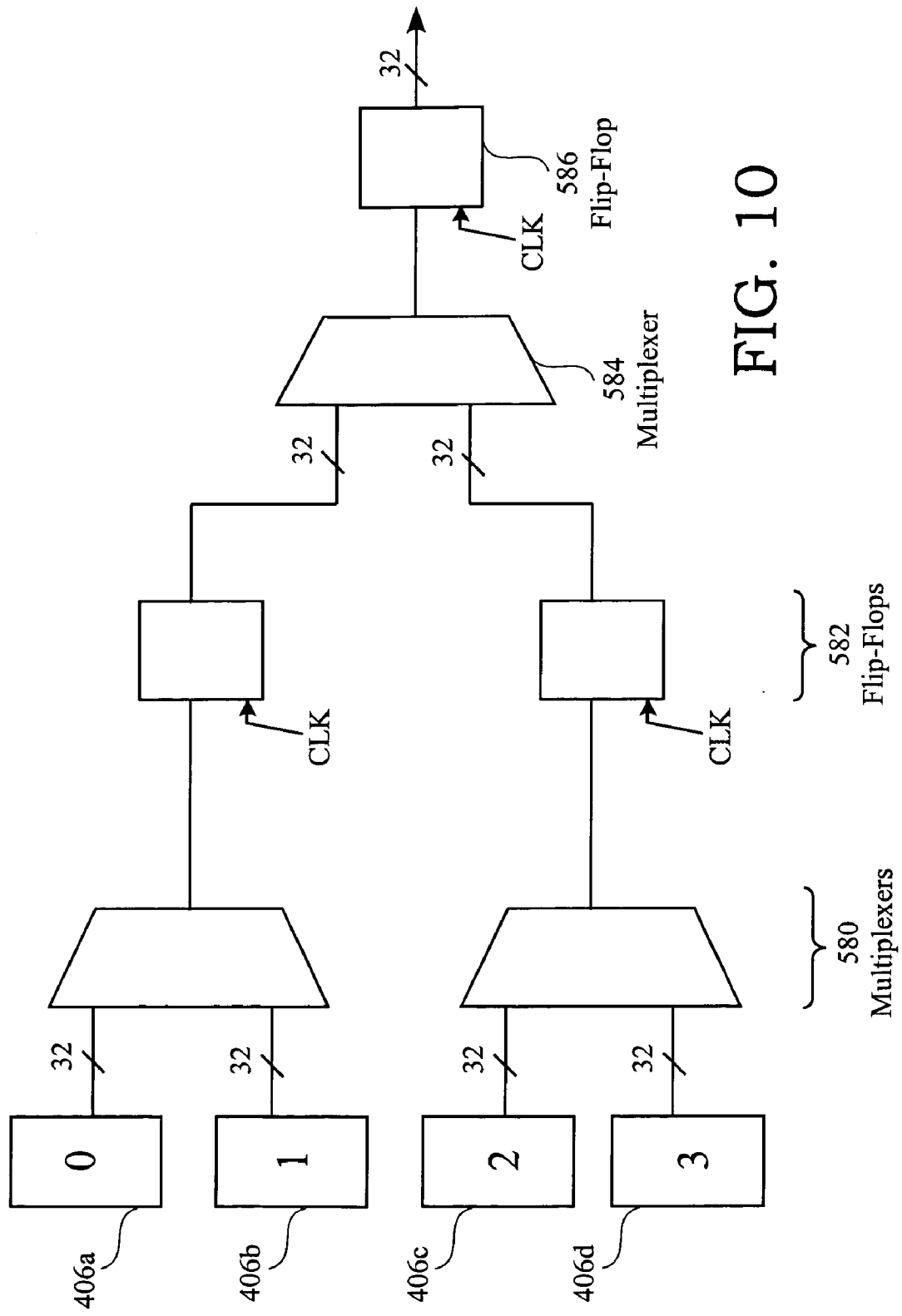
FIG. 10 shows a 4 to 1 multiplexer is shown in accordance with one embodiment of the present invention.

FIG. 10 shows a 4 to 1 multiplexer 404 is shown in accordance with one embodiment of the present invention. The 4:1 multiplexer 404 is implemented in 2 stages. In this embodiment, the 4 to 1 multiplexer 404 includes multiplexers 580 and 584. The 4 to 1 multiplexer 404 receives 32-bit words from the input buffers 406a, 406b, 406c, and 406d and the four 32-bit words are multiplexed using the multiplexers 580 and 584 to reduce the data to a single 32-bit word. The data is registered after each stage of multiplexing using the flip flops 582 and 586. After multiplexing, the 4 to 1 multiplexer 404 outputs 32-bit data at 77.78 MHz.

Therefore, by intelligent use of a step down and step up converters, a line card may convert 4 bit data at 622.08 MHz to 32 bit data at 77.78 MHz. In this way, different types of networks with different types data can be connected to provide seamless communication. In addition, by use of the line card and a SERDES, serial to parallel and parallel to serial conversion across 622.08 MHz and 77.78 MHz may be accomplished.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A line card for use in a node of a network to connect to optical network lines, comprising:
    an optical interface;
    a serializer/deserializer (SERDES) configured to operate at a first frequency; and
    a framer configured to operate at a second frequency, the first frequency being higher than the second frequency, the framer including a digital step up converter to receive data from the SERDES and a digital step down converter to supply data to the SERDES;
    wherein the step down converter includes a set of input buffers, each input buffer configured to receive a word of nibbles from the framer, the input buffers being loaded one after another, but extraction from each of the input buffers to a multi-stage multiplexer is triggered so long as a non-reset window is preserved;
    wherein the step up converter includes a set of input buffers and a register array, each input buffer configured to receive a word of nibbles from the register array, the input buffers being loaded one after another, but extraction from the input buffers to a multi-stage multiplexer is triggered so long as a non-reset window is preserved, and wherein the set of input buffers of the step up converter includes 4 input buffers and the set of input buffers of the step down converter includes 4 input buffers;
    wherein the multi-stage multiplexer of the step down converter is a 5 stage converter.

2. A line card for use in a node of a network to connect to optical network lines, comprising:
    an optical interface;
    a serializer/deserializer (SERDES) configured to operate at a first frequency; and
    a framer configured to operate at a second frequency, the first frequency being higher than the second frequency, the framer including a digital step up converter to receive data from the SERDES and a digital step down converter to supply data to the SERDES;
    wherein the step down converter includes a set of input buffers, each input buffer configured to receive a word of nibbles from the framer, the input buffers being loaded one after another, but extraction front each of the input buffers to a multi-stage multiplexer is triggered so long as a non-reset window is preserved;
    wherein the step up converter includes a set of input buffers and a register array, each input buffer configured to receive a word of nibbles from the register array, the input buffers being loaded one after another, but extraction from the input buffers to a multi-stage multiplexer is triggered so long as a non-reset window is preserved, and wherein the set of input buffers of the step up converter includes 4 input buffers and the set of input buffers of the step down converter includes 4 input buffers;
    wherein the multi-stage multiplexer of the step up converter is a 2 stage converter.

3. A line card for use in a node of a network to connect to optical network lines, comprising:
    an optical interface;
    a serializer/deserializer (SERDES) configured to operate at a first frequency; and
    a framer configured to operate at a second frequency, the first frequency being higher than the second frequency, the framer including a digital step up converter to receive data from the SERDES and a digital step down converter to supply data to the SERDES;
    wherein the step down converter includes a set of input buffers, each input buffer configured to receive a word of nibbles from the framer, the input buffers being loaded one after another, but extraction from each of the input buffers to a multi-stage multiplexer is triggered so long as a non-reset window is preserved;
    wherein the step up converter includes a set of input buffers and a register array, each input buffer configured to receive a word of nibbles from the register array, the input buffers being loaded one after another, but extraction from the input buffers to a multi-stage multiplexer is triggered so long as a non-reset window is preserved, and wherein the set of input buffers of the step up converter includes 4 input buffers and the set of input buffers of the step down converter includes 4 input buffers;
    wherein the register array is configured to receive 4 bit data from the SERDES and configured to send 32 bit data to the set of input buffers.

4. A line card for use in a node of a network to connect to optical network lines, comprising:
    an optical interface;
    a serializer/deserializer (SERDES) configured to operate at a first frequency; and
    a framer configured to operate at a second frequency, the first frequency being higher than the second frequency, the framer including a digital step up converter to receive data from the SERDES and a digital step down converter to supply data to the SERDES;
    wherein the step down converter includes a set of input buffers, each input buffer configured to receive a word of nibbles from the framer, the input buffers being loaded one after another, but extraction from each of the input buffers to a multi-stage multiplexer is triggered so long as a non-reset window is preserved;
    wherein the step up converter includes a set of input buffers and a register array, each input buffer configured to receive a word of nibbles from the register array, the input buffers being loaded one after another, but extraction from the input buffers to a multi-stage multiplexer is triggered so long as a non-reset window is preserved, and wherein the set of input buffers of the step up converter includes 4 input buffers and the set of input buffers of the step down converter includes 4 input buffers;

wherein the multi-stage multiplexer of the step down converter is configured to receive 32 bit data and to output 4 bit data.

5. A line card for use in a node of a network to connect to optical network lines, comprising:

an optical interface;

a serializer/deserializer (SERDES) configured to operate at a first frequency; and a framer configured to operate at a second frequency, the first frequency being higher than the second frequency, the framer including a digital step up converter to receive data from the SERDES and a digital step down converter to supply data to the SERDES;

wherein the step down converter includes a set of input buffers, each input buffer configured to receive a word of nibbles from the framer, the input buffers being loaded one after another, but extraction from each of the input buffers to a multi-stage multiplexer is triggered so long as a non-reset window is preserved;

wherein the step up converter includes a set of input buffers and a register array, each input buffer configured to receive a word of nibbles from the register array, the input buffers being loaded one after another, but extraction from the input buffers to a multi-stage multiplexer is triggered so long as a non-reset window is preserved, and wherein the set of input buffers of the step up converter includes 4 input buffers and the set of input buffers of the step down converter includes 4 input buffers;

wherein the multi-stage multiplexer of the step up converter is configured to receive 32 bit data and to output 4 bit data.

6. In an optical network, a framer that is connected with a serializer/deserializer (SERDES) within a line card, the framer comprising:

a digital step down converter including, a multi-stage multiplexer being configured to supply data to the SERDES, a set of input buffers, each input buffer configured to receive a word of nibbles from the framer, the input buffers being loaded one after another, but extraction from each of the input buffers to the multi-stage multiplexer is triggered so long as a non-reset window is preserved; and a digital step up converter including, a register array being configured to receive data from the SERDES;

a set of input buffers, each input buffer configured to receive a word of nibbles from the register array, the input buffers being loaded one after another, but extraction from the input buffers to a multi-stage multiplexer is triggered so long as a non-reset window is preserved;

wherein the SERDES is configured to operated at a first frequency and the framer is configured to operate at a second frequency, the first frequency being higher than the second frequency, wherein the register array is configured to receive 4 bit data from the SERDES and configured to send 32 bit data to the set of input buffers.

7. A framer as recited in claim 6, wherein the multi-stage multiplexer of the step down converter is a 5 stage converter.

8. A line card for use in a node of a network to connect to optical network lines as recited in claim 6, wherein the multi-stage multiplexer of the step up converter is a 2 stage converter.

9. A line card for use in a node of a network to connect to optical network lines as recited in claim 6, wherein the set of input buffers of the step up converter includes 4 input buffers and the set of input buffers of the step down converter includes 4 input buffers.

10. A line card for use in a node of a network to connect to optical network lines as recited in claim 6, wherein the first frequency is 622.08 MHz.

11. A line card for use in a node of a network to connect to optical network lines as recited in claim 6 wherein the second frequency is 77.76 MHz.

12. A line card for use in a node of a network to connect to optical network lines as recited in claim 6, wherein the multi-stage multiplexer of the step down converter is configured to receive 32 bit data and to output 4 bit data.

13. A line card for use in a node of a network to connect to optical network lines as recited in claim 6, wherein the multi-stage multiplexer of the step up converter is configured to receive 4 bit data and to output 32 bit data.

14. A line card for use in a node of a network to connect to optical network lines, comprising:

an optical interface;

a serializer/deserializer (SERDES) configured to operate at a first frequency, the SERDES being connected to the optical interface; and a framer configured to operate at a second frequency, the first frequency being higher than the second frequency, the framer including a digital step up converter and a digital step down converter;

wherein the step down converter includes a set of 4 input buffers, each input buffer configured to receive a word of nibbles from the framer, the input buffers being loaded one after another, but extraction from each of the input buffers to a 5 stage multiplexer is triggered so long as a non-reset window is preserved, the 5 stage multiplexer being configured to supply data to the SERDES;

wherein the step up converter includes a set of 4 input buffers and a register array, each input buffer configured to receive a word of nibbles from the register array, the input buffers being loaded one after another, but extraction from the input buffers to a 2 stage multiplexer is triggered so long as a non-reset window is preserved, and the register array of the step up converter being configured to receive data from the SERDES, wherein the register array is configured to receive 4 bit data from the SERDES and configured to send 32 bit data to the set of input buffers.

15. A line card for use in a node of a network to connect to optical network lines as recited in claim 14, wherein the first frequency is 622.08 MHz.

16. A line card for use in a node of a network to connect to optical network lines as recited in claim 15, wherein the second frequency is 77.76 MHz.

17. In an optical network, a framer that is connected with a SERDES within a line card, the framer comprising:

a digital step down converter including, a five stage multiplexer being configured to supply 4 bit data to the SERDES, a set of four input buffers, each input buffer configured to receive eight sets of 4 bit data from the framer, the input buffers being loaded one after another, but extraction from each of the input buffers to the five multiplexer is triggered so long as a non-reset window is preserved; and a digital step up converter including,
  a register array being configured to receive 4 bit data from the SERDES;
  a set of four input buffers, each input buffer configured to receive 8 sets of 4 bit data from the register array, the input buffers being loaded one after another, but extraction from the input buffers to a two stage multiplexer is triggered so long as a non-reset window is preserved;
wherein the SERDES is configured to operated at a frequency of is 622.08 MHz and the framer is configured to operate at a frequency of 77.76 MHz, and wherein the 2 stage multiplexer of the step down converter is configured to receive 32 bit data and to output 4 bit data.

18. A line card for use in a node of a network to connect to optical network lines as recited in claim 17, wherein the five multiplexer of the step up converter is configured to receive 4 bit data and to output 32 bit data.

19. A method for transferring data between a framer and a serializer/deserializer (SERDES) of a line card used in an optical network, comprising:
  when the data is being transferred from the framer to the SERDES,
  receiving data from the framer, the framer operating at a first frequency,
  loading the data in a set of input buffers of a digital step down converter, the input buffers being loaded one after another, each of the input buffers holding a word of nibbles,
  extracting the data from each of the input buffers of the digital step down converter to a multi-stage multiplexer of the step down converter, the input buffers being extracted one after another, the extracting being triggered so long as a non-reset window of the step down converter is preserved,
  transmitting the data from the multi-stage multiplexer of the step down converter to the SERDES, the SERDES configured to operate at a second frequency, the first frequency being higher than the second frequency; and
  when the data is being transferred from the SERDES to the framer,
  transferring the data from the SERDES to a register array,
  receiving the data from the register array,
  loading the data in a set of input buffers of a digital step up convertor, the input buffers being loaded one after another, each of the input buffers holding a word of nibbles,
  extracting the data from each of the input buffers of the digital step up converter to a multi-stage multiplexer of the step up converter, the input buffers being extracted one after another, the extracting being triggered so long as a non-reset window of the step up converter is preserved,
  transmitting the data from the multi-stage multiplexer of the step up converter to the framer, and wherein the multi-stage multiplexer of the step down converter is a 5 stage converter.

20. A method for transferring data between a framer and a serializer/deserializer (SERDES) of a line card used in an optical network as recited in claim 19, wherein the multi-stage multiplexer of the step up converter is a 2 stage converter.

21. A method for transferring data between a framer and a serializer/deserializer (SERDES) of a line card used in an optical network as recited in claim 20, wherein the first frequency is 622.08 MHz and the second frequency is 77.76 MHz.

22. A method for transferring data between a framer and a serializer/deserializer (SERDES) of a line card used in an optical network as recited in claim 21, wherein the register array is configured to receive 4 bit data from the SERDES and configured to send 32 bit data to the set of input buffers.

23. A method for transferring data between a framer and a serializer/deserializer (SERDES) of a line card used in an optical network as recited in claim 22, wherein the multi-stage multiplexer of the step down converter is configured to receive 32 bit data and to output 4 bit data.

24. A method for transferring data between a framer and a serializer/deserializer (SERDES) of a line card used in an optical network as recited in claim 23, wherein the multi-stage multiplexer of the step up converter is configured to receive 32 bit data and to output 4 bit data.

25. A method for transferring data between a framer and a serializer/deserializer (SERDES) of a line card used in an optical network as recited in claim 23, wherein extracting the data from each of the input buffers of the digital step down converter to a multi-stage multiplexer of the step down converter includes,
  extracting the data from a particular one of the input buffers of the digital step down converter to a multi-stage multiplexer of the step down converter when at least one additional input buffer has been filled after the particular one of the input buffers has been filled.

26. A method for transferring data between a framer and a serializer/deserializer (SERDES) of a line card used in an optical network as recited in claim 23, wherein extracting the data from each of the input buffers of the digital step up converter to a multi-stage multiplexer of the step up converter includes,
  extracting the data from a particular one of the input buffers of the digital step up converter to a multi-stage multiplexer of the step up converter when at least one additional input buffer has been filled after the particular one of the input buffers has been filled.

* * * * *